United States Patent
Koskinen et al.

(10) Patent No.: US 9,086,779 B2
(45) Date of Patent: Jul. 21, 2015

(54) INPUT DEVICE

(75) Inventors: Sanna M. Koskinen, Puistokato (FI);
Sanna Lindroos, Valkeakoski (FI); Nina Maki, Pirkkala (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 937 days.

(21) Appl. No.: 11/317,673

(22) Filed: Dec. 22, 2005

(65) Prior Publication Data
US 2008/0005698 A1    Jan. 3, 2008

(51) Int. Cl.
*G06F 3/048*     (2013.01)
*G06F 3/0481*    (2013.01)
*G06F 3/0482*    (2013.01)
*H04M 1/725*     (2006.01)
*G06F 3/0488*    (2013.01)

(52) U.S. Cl.
CPC .......... *G06F 3/04817* (2013.01); *G06F 3/0481* (2013.01); *G06F 3/0482* (2013.01); *H04M 1/72544* (2013.01); *G06F 3/04883* (2013.01); *H04M 1/72583* (2013.01)

(58) Field of Classification Search
USPC .......... 345/168, 169; 715/810, 821, 825, 835, 715/837, 840, 846, 847
See application file for complete search history.

(56) References Cited

U.S. PATENT DOCUMENTS

| | | | | |
|---|---|---|---|---|
| 4,698,625 A * | 10/1987 | McCaskill et al. | | 345/157 |
| 5,307,457 A * | 4/1994 | Beitel et al. | | 715/860 |
| 5,592,605 A * | 1/1997 | Asuma et al. | | 715/775 |
| 5,634,102 A * | 5/1997 | Capps | | 715/744 |
| 5,737,553 A * | 4/1998 | Bartok | | 715/764 |
| 5,874,959 A * | 2/1999 | Rowe | | 345/634 |
| 5,943,055 A | 8/1999 | Sylvan | | |
| 6,337,703 B1 * | 1/2002 | Konar et al. | | 715/858 |
| 6,469,722 B1 * | 10/2002 | Kinoe et al. | | 715/837 |
| 6,597,378 B1 * | 7/2003 | Shiraishi et al. | | 715/764 |
| 7,042,450 B1 * | 5/2006 | Edgin et al. | | 345/420 |
| 2003/0016247 A1 * | 1/2003 | Lai et al. | | 345/764 |
| 2005/0024341 A1 * | 2/2005 | Gillespie et al. | | 345/173 |
| 2005/0257170 A1 * | 11/2005 | Kim et al. | | 715/825 |
| 2005/0280660 A1 * | 12/2005 | Seo et al. | | 345/629 |
| 2006/0010395 A1 * | 1/2006 | Aaltonen | | 715/779 |
| 2006/0095866 A1 * | 5/2006 | Kiiskinen | | 715/810 |

FOREIGN PATENT DOCUMENTS

EP   0403116 A2   12/1990
WO   2006045879 A1   5/2006

OTHER PUBLICATIONS

Adobe Creative Team, "Adobe Photoshop 7.0 Classroom in a Book", published on Jun. 25, 2002; Adobe presss, 442-493.*
Canadian Office Action dated Oct. 4, 2010.

* cited by examiner

*Primary Examiner* — Tuyetlien Tran
(74) *Attorney, Agent, or Firm* — Core Wireless Licensing (57) ABSTRACT

This invention relates to a mobile communications device and a method for controlling a menu on a mobile communications device having a display with an idle mode background image. The method comprises receiving a user input from a control device, relating the user input to an area of said display, determining an application which is linked to said area such that said application is executed in response to the selection of said area, and superposing an application icon associated with said application over at least a part of said idle mode background image.

24 Claims, 5 Drawing Sheets

INPUT DEVICE

TECHNICAL FIELD

The present invention generally relates to a method and device for controlling a menu on a mobile communications device.

BACKGROUND OF THE INVENTION

During the last decades, the mobile communications device has become a common item for many people throughout the world. From being an item focused on telephone communication, the mobile communications device of today is more to be described as portable media and communication device with, for instance, built-in camera, Internet access and many other communication services. The new features set new demands on the usability of the mobile terminals. One important usability issue is controlling the menu system. An easy and intuitive menu system may be decisive when a customer chooses a new mobile communications device. Therefore, it is of great importance for mobile communications device developers to take this issue into account.

Another important issue when a customer is choosing a new mobile communications device is the possibilities to personalize it. Such possibilities may for example be exchangable casings, user selectable ring tones, user selectable wallpapers etc.

These two issues have give rise to new features making it possible to personalize the menu system, e.g., by having user selectable icons and user configurable buttons, which the user himself may associate to a program application.

However, although these features for personalizing exist, there is a need for more sophisticated personalizing features, in order to make it possible for the user to make his mobile communications device a one of a kind.

SUMMARY OF THE INVENTION

In view of the above, an objective of the invention is to provide a method for controlling a menu on a mobile communications device, which easily can be adjusted according to the personal preferences of the user. In particular, an objective is to provide a method for controlling a menu on a mobile communications device having a display with an idle mode background image.

Throughout this text the words "choose" and "select" are to be interpreted as:

"choose"—to mark or in other way prepare an item for activation, e.g., when placing a cursor on an application icon the icon is chosen;

"select"—to activate or in other way send information to an application to start, e.g., pressing a button after having chosen an application icon, and thereby starting the application.

Further, the term "mode" is to be interpreted as a state of the mobile communications device. The "idle mode" is e.g., a state where the mobile communications device is waiting for some sort of input, such as user input or an incoming message or telephone call. In this mode it is common to have a background image.

In the "menu mode" according to prior art, the available applications are shown to the user, e.g., in the form of application icons illustrated by small images, which gives him a good overview. Since the application icons are shown in this mode, there is no space for showing a background image.

However, according to the present invention the application icons are comprised in the idle mode background image, whereby the idle mode background image can be used in both modes, which gives the user interface of the mobile telephone a more personalized expression. Therefore, a positive outcome of the present invention is that the same background image can be used in idle mode as well as in menu mode. Hence, the wording "idle mode background image", in the context of this invention, does not only comprise the background image shown in idle mode, but also the background image shown in menu mode.

According to a first aspect, the present invention is realised by a method for controlling a menu on a mobile communications device having a display with an idle mode background image, comprising receiving a user input from a control device, relating said user input to an area of said display, determining an application linked to said area such that the application is executed in response to the selection of the area, and superposing an application icon associated with said application over at least a part of said idle mode background image.

An advantage with this aspect is that the idle mode background image is used both in idle mode and in menu mode. That is, a user selected image may be used in the menu mode as well.

Another advantage is that an area of said idle mode background image may be linked to an application. This means, if the area is user adjustable, that the user may choose an arbitrary area of the idle mode background image and link this to an application.

Yet another advantage is that the application icon corresponding to the presently chosen area is superposed over a part of the idle mode background image. Because of this the user continuously receive information about which application that is presently chosen.

The method may further comprise dividing said idle mode background image into a plurality of areas wherein at least one of the plurality of areas is linked to an application.

An advantage with this embodiment is that different areas of the idle mode background image may be linked to different applications. For instance, in an idle mode background image representing a sunset in Sahara, the sky may be linked to the message handler application, the sun may be linked to the contact handler application, and the sand may be linked to the browser application.

The user input may further correspond to a coordinate on said display.

An advantage with this is that the user input may easily be determined to be inside or outside an area of the display by simple comparisons.

The part of said idle mode background image may further correspond to the area of the display.

An advantage with this is that the application icon is shown in the entire area linked to the application. Hence, the user may easily understand the relationship between the areas in the idle mode background image and the applications.

The idle mode background image may further be user selectable. This gives the user possibilities to personalize the mobile communications device.

The application icon may further be user selectable. An advantage with this is that the user may personalize the mobile communications device.

The area may further be confined by a non-visible grid system. An advantage with this is that the non-visible grid system will not cover the idle mode background image.

Another advantage with having a grid system is that the areas of the idle mode background image are easily set by the user.

Further, a shape of an element in the grid system may be user selectable and/or user definable, i.e. the shape of an element may be selected from a range of figures such as a circle, triangle, rectangle or any other predetermined polygon, or the user may define the shape of the element by providing coordinates defining the corners of a polygon (e.g. 0.0; 0.1; 1.1; 1.0 may define a rectangle).

An advantage with this is that the user may adjust the areas in the idle mode background image according to his personal preferences.

Further, a number of elements in the grid system may be user selectable. An advantage with this is that the user may adjust the areas in the idle mode background image according to his personal preferences.

Further, a visible text may be associated with the area. An advantage with this is that the user may easily understand the relation between the area and the application linked to the area.

The grid system may further be visible in a setting mode. An advantage with this is that the user may easily set the grid system according to his preferences in a setting mode, e.g., using a drag-and-drop technology. The method may further comprise receiving a second user input from said control device, and executing said application. An advantage with this is that the choosing and selection is divided into two steps. In the choosing step, a user input is related to an area and an application icon is shown, and in the selection step, if a second user input is received, the corresponding application is executed.

The second user input may further correspond to a pressed button.

According to a second aspect of the invention, the present invention is realised by a mobile communications device comprising a control device, a display, a user input receiver for receiving a user input from said control device, an electronic circuitry adapted for relating said user input to an area of said display, and a electronic circuitry adapted for superposing an application icon corresponding to said area over a part of an idle mode background image.

The mobile communications device may further comprise a electronic circuitry adapted for dividing said idle mode background image into a plurality of areas wherein at least one of the plurality of areas is linked to an application.

According to a third aspect, the invention is realised by a computer program, comprising computer program code for performing the steps of the method mentioned above when executed in a device with data processing capabilities.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
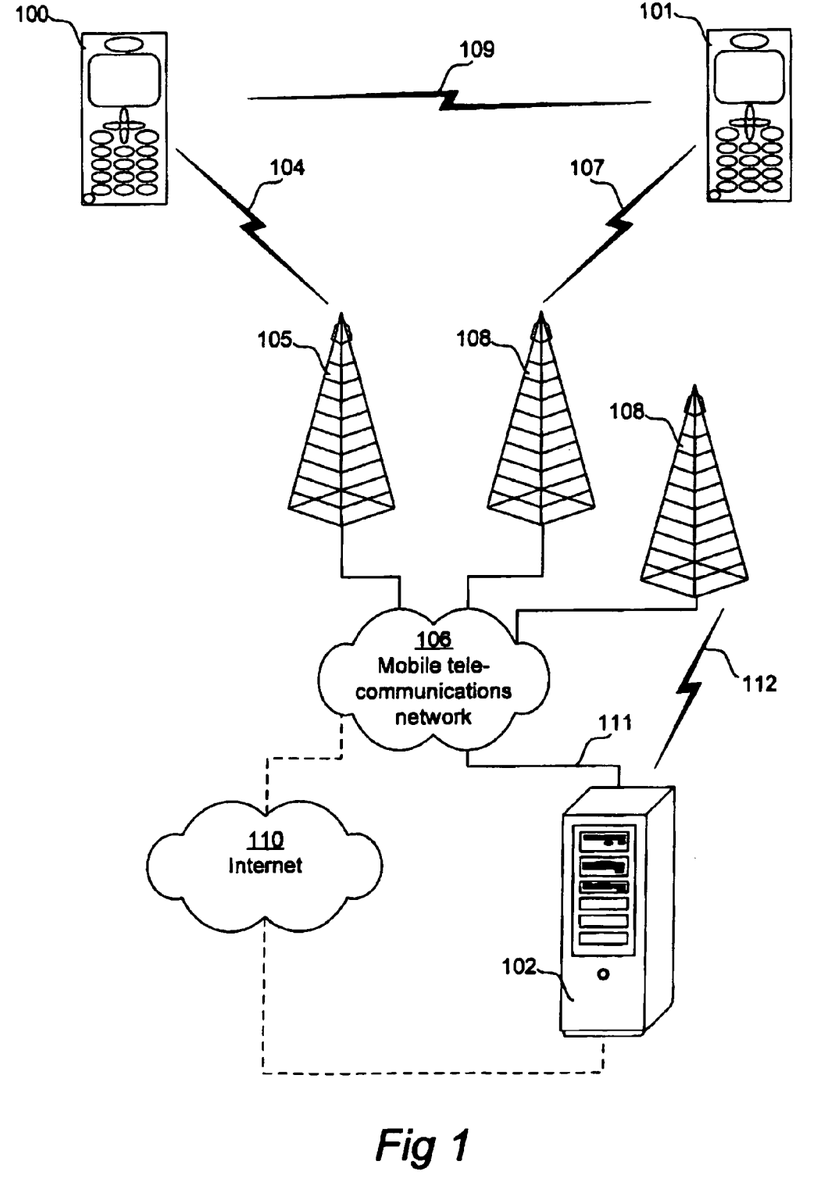
FIG. 1 diagrammatically illustrates a mobile telecommunications system.

FIG. 1 illustrates a mobile telecommunications system in which the present invention may be applied. As shown in the figure, a first mobile communications device 100 may communicate with a second mobile communications device 101 or a server 102 via a wireless link 104, a base station 105 and a mobile telecommunications network 106. Likewise may the second mobile communications device 101 communicate with the first mobile communications device 100 or the server 102 via a wireless link 107, a base station 108 and the mobile telecommunications network 106.

The first mobile communications device 100 and the second mobile communications device 101 are preferably adapted to operate in a mobile telecommunications system such as UMTS, GSM, or D-AMPS. It is however appreciated that operation in other mobile telecommunication systems is equally possible depending on the infrastructure in respect of mobile telecommunications provided in the area in which the mobile communications devices 100, 101 are located. The first mobile communications device 100 and second mobile communications device 101 may be adapted to operate in different mobile telecommunications systems and interconnected via an interface in the mobile telecommunications network 106 (not shown). This may be the case in areas where a system belonging to a new generation of mobile telecommunications (e.g. UMTS) has not been fully implemented and interacts with an older system for mobile telecommunications (such as GSM).

Additionally, the first mobile communications device 100 and second mobile communications device 101 may be adapted to communicate directly with each other by means of a short range wireless communication link 109, such as Bluetooth™, WLAN (Wireless Local Area Network, e.g. as specified in IEEE 802.11), HomeRF or HIPERLAN.

The server 102 may be adapted to communicate with the mobile telecommunications network 106 via the Internet 110 as indicated by the dashed line in FIG. 1. The server may also be adapted to communicate directly with the mobile telecommunications network 106 by means of cable 111, or via a short range (such as WLAN) or long range (such as UMTS) wireless link 112 depending on the environment in which the server is located.

Figure 2:
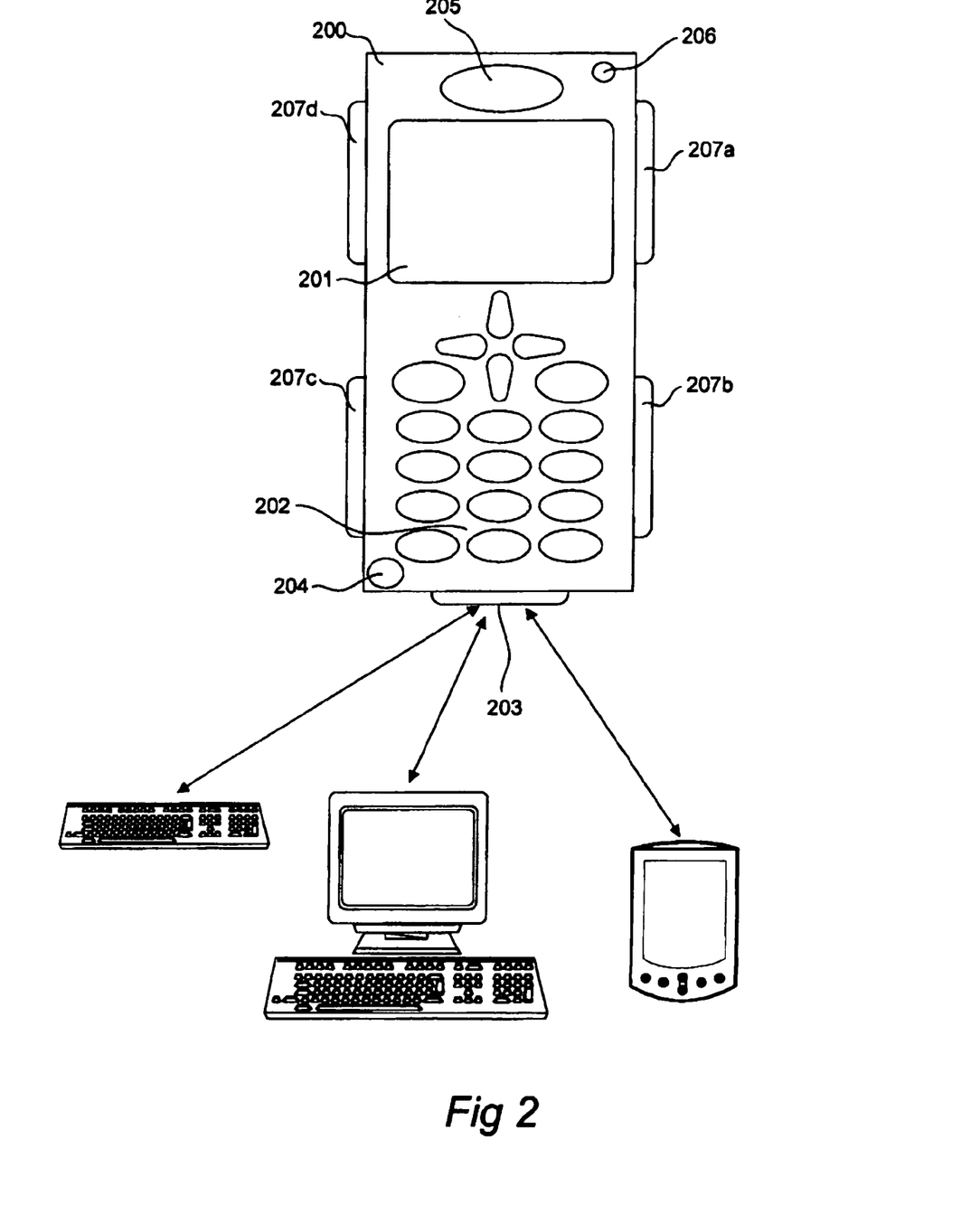
FIG. 2 diagrammatically illustrates a mobile communications device.

FIG. 2 illustrates a mobile communications device 200 according to a preferred embodiment of the present invention. The mobile telecommunications terminal 200 preferably comprises a display 201 for presenting information, e.g. regarding the current operational status of the mobile telecommunications terminal 200, to the user of the mobile telecommunications terminal 200. The display 201 may for instance also be used for displaying names and telephone numbers stored in a memory in the mobile telecommunications terminal 200, graphical images, icons, video sequences, graphical game interfaces, etc.

The mobile telecommunications terminal 200 also preferably comprises an input control device 202 which may be in the form of a keyboard; an on-screen touch-sensitive keyboard; a navigation wheel or joystick for scrolling and selecting items, digits and/or characters shown on the display 201; etc. The input control device 202 may be integral with the mobile telecommunications terminal 200 or separate from the mobile telecommunications terminal 200, wherein the input control device 202 is connected to the mobile telecommunications terminal 200 when needed. The input control device 202 in the mobile telecommunications terminal 200 may alternatively be in the form of e.g. an integral navigation wheel for normal use as well as a connector 203 for connecting the mobile telecommunications terminal 200 to an external data source e.g. in the form of a full-size keyboard, a personal computer, a personal digital assistant, etc.

It is appreciated that the relative size of the display 201 is not restricted to the embodiment shown in FIG. 2; the display may be a touch-sensitive display covering most of the front of the mobile telecommunications terminal 200, wherein the display substitutes the keyboard shown in FIG. 2 and instead provides a keyboard 202 as a graphical, touch-sensitive image on the display 201.

The input control device 202 may be adapted to emit light in different colors. The keyboard shown in FIG. 2 may be manufactured from a semi-transparent polymer which allows light to pass through the buttons on the keyboard, wherein the light emitted by the keyboard may be provided by light emitting diodes or small lamps arranged inside the mobile telecommunications terminal 200.

The mobile telecommunications terminal 200 preferably comprises a microphone 204 which picks up audio data (speech) from the user of the mobile telecommunications terminal 200. The audio data is then processed in the mobile telecommunication terminal 200 according to techniques known per se depending on which type of mobile telecommunication network the mobile telecommunication terminal is operating in (e.g. the audio data may be vocoded in order to save bandwidth of the wireless communication link 104). The speech of the user is thereafter transferred to another user via the wireless communication link 104 and the mobile telecommunications network 106.

The mobile telecommunications terminal 200 preferably comprises a loudspeaker 205 for playing back audio data received in the mobile telecommunication terminal 200 via the wireless communication link 104. The loudspeaker 205 may also be used for playing back audio data generated in the mobile telecommunications terminal 200 (such as music composed by the user of the mobile telecommunications terminal 200, or sound generated by an electronic game running in the mobile telecommunications terminal 200) or stored in the mobile telecommunications terminal 200 (such as music downloaded to the mobile telecommunications terminal 200).

The mobile telecommunications terminal 200 may comprise other display means such as a light emitting diode or small lamp 206 which may be used for indicating a current battery status of a battery (not shown) in the mobile telecommunications terminal 200 in that it emits light of different colors, blinking at different rates etc depending on the amount of power preserved in the battery. The light emitting diode 206 may also be used for indicating that a specific person is calling. That is, a user of the mobile telecommunications terminal 200 may set the light emitting diode to flash in a predetermined color when the specific person calls the mobile telecommunications terminal 200.

Additionally, the mobile telecommunications terminal 200 may be provided with additional display means 207a-d which are used for customizing the appearance of the mobile telecommunications terminal 200. All or some of the additional display means 207a-d may be adapted to emit continuous or flashing light in many different colors, emit light only during an ongoing communication via the wireless communication link 104, emit continuous or flashing light when the mobile telecommunications terminal 200 is called by another party, etc. The additional display means 207a-d are preferably manufactured by means of uncolored plastic covers and multi-colored light sources, such as one or more light emitting diodes of different colors arranged together, or by means of colored plastic covers and neutral light sources.

The cover of the mobile telecommunications terminal 200 may be manufactured from a conductive polymer which is adapted to change its color depending on an electric field applied to the cover. Polymers which change their color in the visible spectrum in the presence of a static or dynamic electrical field have been disclosed in e.g. "Tunable Multicolor Electroluminescent Polymer Devices for Full Color Displays" by Samson A. Jenekhe and Xuejun Zhang, ROCHESTER UNIV NY DEPT OF CHEMICAL ENGINEERING, Report number A099663. The user of the mobile telecommunications terminal 200 may hence set the cover to change color when e.g. the mobile telecommunications terminal 200 receives a call from another user terminal, when an alarm in the mobile telecommunications terminal 200 is activated, etc.

Figure 3:
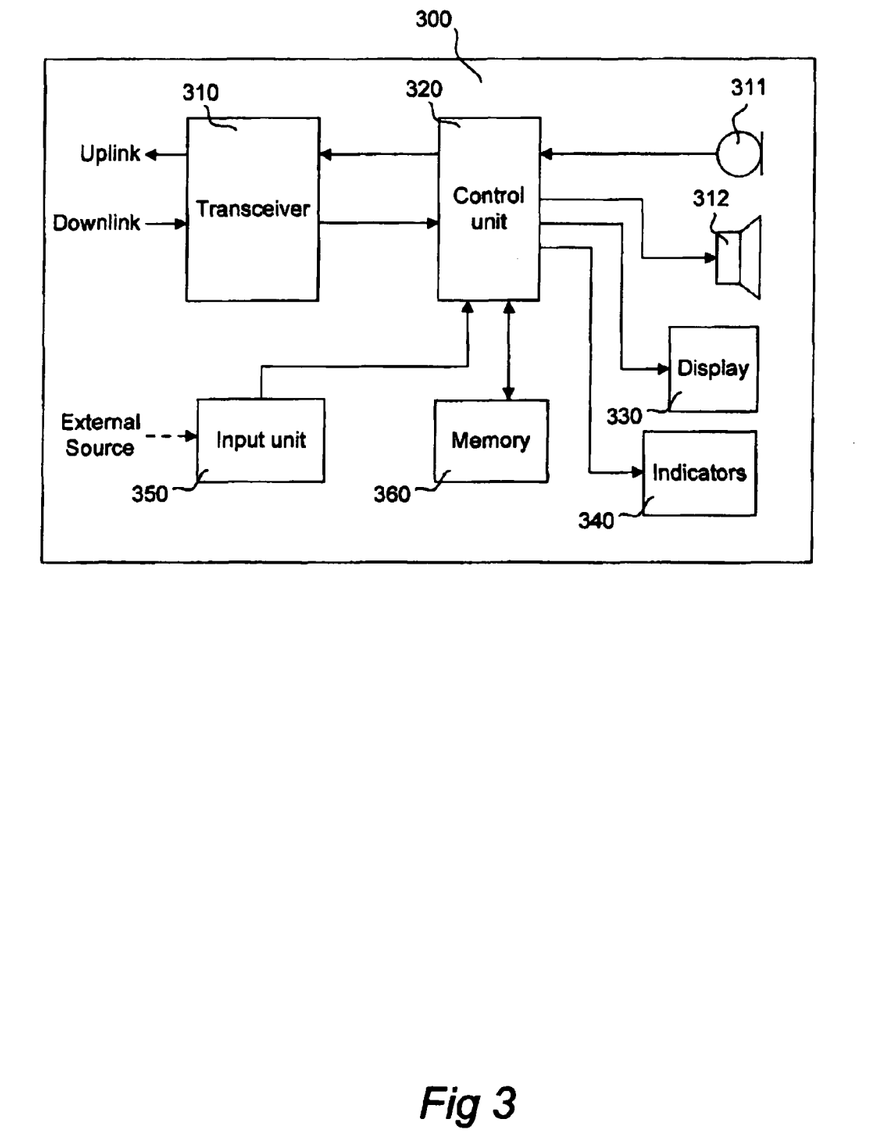
FIG. 3 is a schematic block diagram of a mobile communications device.

FIG. 3 is a schematic block diagram of a mobile communications device 300 according to a preferred embodiment of the present invention. A transceiver 310 is used for communicating with the base station 105. The base station 105 may in turn communicate with other mobile telecommunications terminals 101 or a server 102 via a mobile communications network 106 as disclosed above. The transceiver 310 may be arranged to operate in various frequency bands, such as 880-915 MHz and 925-960 MHz (GSM900), 1710-1785 MHz and 1805-1880 MHz (GSM1800), 1850-1910 MHz and 1930-1990 MHz (GSM1900), and 1885-2025 MHz and 2110-2200 MHz (UMTS). It is however appreciated that other frequency bands are equally possible depending on the specifications of the network in which the mobile communications device 300 is to operate.

A control unit 320 is coupled to the transceiver 310. The control unit 320 may comprise signal processing circuitry in order to process e.g. voice data provided by a microphone 311 and provide the transceiver 310 with the processed data for transmission to the base station 105. Likewise, the control unit 320 may comprise signal processing circuitry for processing data received from another telecommunications terminal 101 in order to provide a loudspeaker 312 with audio data. Alternatively (not shown) some or all of the signal processing functionality may be provided by specialized circuitry in the mobile telecommunication terminal 300.

The control unit 320 is coupled to a display 330 for providing a user of the mobile communications device 300 with visual data as disclosed above. As will be disclosed in more detail below, the display 330 may in particular display graphics forming a part of an adaptable user interface. The control unit is also coupled to an indicator 340 or other display means used for customizing the appearance of the mobile communications device 200.

The control unit 320 is moreover coupled to an input control device 350, which may be in the form of a keyboard etc as disclosed above. The input control device may also be adapted to receive data from an external source as disclosed above and indicated by the dashed line in FIG. 3.

A memory 360 is connected to the control unit 320 and comprises user interface data which may be used to control the multimedial layout of the mobile telecommunications terminal 300, i.e. the manner in which graphic is displayed on the display, how sounds are reproduced by the loudspeaker, the amplification of signals received from the microphone 311, the behavior of the input control device (in case of a keyboard, e.g. the color of light emitted by the keyboard and the delay before the keyboard repeats the output when a key is held down). The user interface data may be provided to the memory 360 from the control unit 320 which in turn has generated the user interface data as a result from configuration data received from the input control device.

The control unit 320 may hence read the user interface data, and software routines for using the data, from the memory 360 for controlling the behavior of the other parts of the mobile telecommunications terminal 300. The memory 360 may also comprise figure data corresponding to one or more figures presentable on the display, wherein the control unit 320 is adapted to use the configuration data received from the input control device for pointing out one or more of the figures in the memory and to display the figures on the display. The configuration data is also preferably used for defining the coordinates on the display, at which coordinates the figures will be displayed. Moreover, the configuration data may also be used for selecting specific audio data in the memory 360, which data preferably become part of the user interface data. The configuration data may also be used for defining one or more control parameters, such as which font to use for displaying text, amount of amplification to use when amplifying a signal provided by the microphone 311, etc.

It is understood in this context that the memory 360 may be a single memory or many different memories, implemented by means of different technologies (such as RAM, ROM, EPROM, EEPROM, Flash, etc) which all are accessible by the control unit 320.

Besides or as an alternative to controlling the multimedial layout of the mobile telecommunications terminal 300, the control unit 320 may provide the user interface data to the transceiver 310 for transmission of the user interface data to another mobile telecommunications terminal 101 or the server 102 in a manner known per se.

Figure 4:
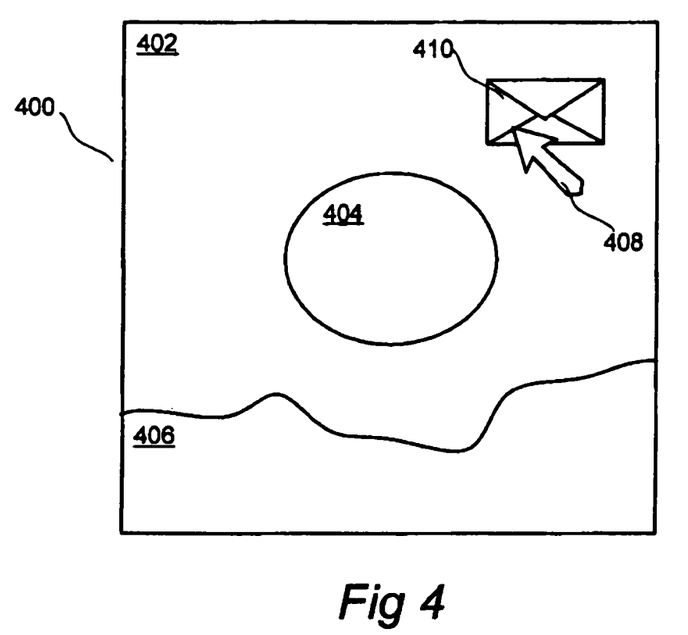
FIG. 4 illustrates a menu system according to a first embodiment.

In FIG. 4, a first embodiment of the menu system according to the present invention is shown. A display of a mobile communications device having an idle mode background image 400 illustrated by a sunset in Sahara is shown. The idle mode background image 400 is divided into three areas; a sky 402, a sun 404 and sand 406. Each area is linked to an application, such as a contact handler or a browser. In this case the sky 402 is linked to a message handler application.

In order to activate the application linked to an area, the area can be chosen and activated by the user. The area can be chosen by the user by pointing a cursor 408 onto the corresponding area, and in order to select the area some sort of second user input, such as a button press, can be received by the communications device. In this case the sky 402 is chosen since the cursor 408 points at this. As an effect of choosing the area corresponding to the message handler application a corresponding application icon is shown. In this case the application icon corresponding to the message handler application is illustrated as an image representing a letter 410.

Instead of representing the application icon by an image, it may be represented by a text or a sound, or any combination thereof.

Figure 5:
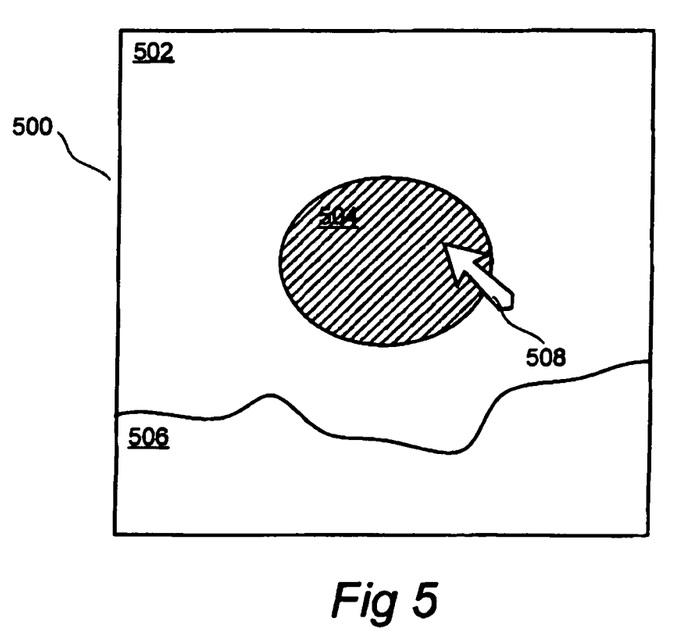
FIG. 5 illustrates a menu system according to a second embodiment.

However, in the present invention an application icon does not have to be a small image illustrating something which is related to the corresponding application. In FIG. 5, a second embodiment of the present invention is shown, wherein the application icon is shown in the entire area associated to the application and the application icon is a color.

As in the embodiment illustrated in FIG. 4, the idle mode background image 500 is illustrated by a sunset in Sahara comprising a sky 502, a sun 504 and sand 506, wherein each of these represents an area linked to an application.

When the sun 504 is marked by a cursor 508 the area corresponding to the sun 504 is chosen, and hence an application icon is shown in the entire area of the sun 504 and since the application icon is a color the entire sun 504 changes color.

Instead of changing color in the entire area, an image and/or a text may be inserted in the area corresponding to the sun. These images and texts may be user selectable.

In the example illustrated in FIGS. 4 and 5, all areas of the idle mode background image are linked to an application. This is not a must. There may namely be areas of the idle mode background image which are not linked to any application, and hence no application icon will be shown when any of these are chosen.

The areas of the idle mode background image described above is set in a setting mode. In order to facilitate the setting procedure a grid system is used. In order to have the idle mode background image as unaffected as possible, the grid system is visible in the setting mode and non-visible otherwise. However, if the grid system is not considered to affect the idle mode background image negatively, the grid system may also be visible in a using mode.

Figure 6:
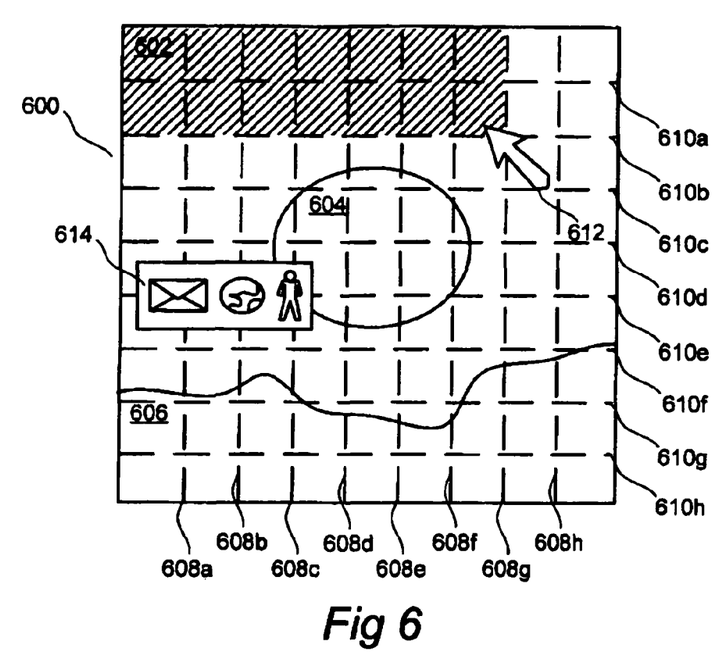
FIG. 6 illustrates a menu system setting mode according to a first embodiment.

In FIG. 6 a menu system setting mode is shown. As in above mentioned figures the idle mode background image 600 is illustrated by a sunset in Sahara comprising a sky 602, a sun 604 and sand 606, wherein each of these represents an area linked to an application.

In this setting mode the idle mode background image is further divided into a grid system comprising vertical confining lines 608a-h and horizontal confining lines 610a-h. The grid elements formed by the lines are marked by a cursor 612 and related to an application.

In order to relate a grid element, or a group of elements, a setting menu 614 can be used. If such a setting menu 614 is used a number of grid elements are marked and thereafter related to one of the applications of the setting menu 614. The opposite order is also possible, i.e. first choosing an application in the setting menu and thereafter marking a number of grid elements.

Applications may be added to and withdrawn from the setting menu according to the preferences of the user. In the preferred embodiment all applications are available in the setting menu as default.

Another way of determining the areas is to have movable vertical and horizontal confining lines, which are possible to move according to "drag-and-drop" technique, i.e. marking a point on a line with a cursor, dragging the marked line to another place and thereby reconfiguring the line.

Figure 7:
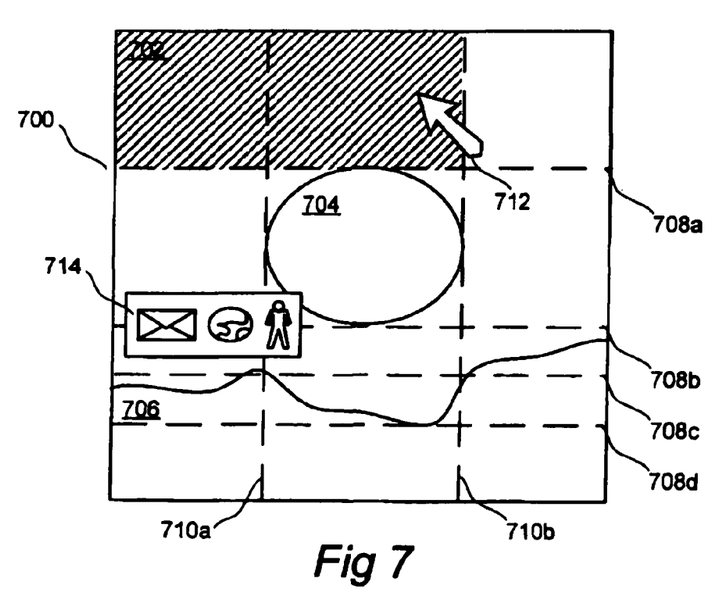
FIG. 7 illustrates a menu system setting mode according to a second embodiment.

In FIG. 7, a menu system setting mode with movable lines is shown. As in above mentioned figures, the idle mode background image 700 is illustrated by a sunset in the Sahara comprising a sky 702, a sun 704 and sand 706, wherein each of these represents an area linked to an application. The grid system comprises horizontal confining lines 708*a-d* and vertical confining lines 710*a-b*.

In order to relate areas of the idle mode background image 700 to applications, the number of horizontal and vertical confining lines are determined, respectively, and the horizontal and vertical confining lines are adjusted horizontally and vertically, respectively, and groups of grid elements are marked with a cursor 712 and related to applications as described above. In order to relate a grid element, or a group of elements, a setting menu 714 similar to the setting menu 614 of FIG. 6, can be used.

Another possibility to define areas in the idle mode background image is to encircle these using the cursor.

Advantageously, this is done by defining a number of corner coordinates with the cursor, and thereafter automatically joining these corner coordinates into a polygon that encircles the area.

Preferably, the grid system is image specific. Therefore, when downloading an image to be set as an idle mode background image an associated grid system and a set of application icons can also be downloaded. When downloading image, grid system and application icons at the same time the user does not have to configure anything himself. It is, however, possible for a user of the invention to manually set the resolution of the grid.

The method according to the claimed invention can be implemented by a computer readable memory, comprising computer readable program code which when executed on a processor carries out the above method.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, comprising:
   dividing an idle mode background image of a display of a mobile communications device into one or more grid elements of a grid system, the grid system comprising vertical confining lines and horizontal confining lines;
   receiving input from a control device of the mobile communications device;
   relating the input to at least one of the one or more grid elements;
   determining an application which is linked to the at least one of the one or more related grid elements such that the application is operable to be executed in response to a selection of the at least one or more related grid elements; and
   upon selection of the at least one or more related grid elements, superposing an application icon associated with the application over at least a part of the idle mode background image;
   wherein the grid system is visible in a setting mode and non-visible otherwise; and
   wherein the grid system is specific for the idle mode background image so that the aspect ratio of the grid system is independent of the user input.

2. The method according to claim 1, wherein the input corresponds to a coordinate on the display.

3. The method according to claim 1, wherein the idle mode background image is selectable.

4. The method according to claim 1, further comprising:
   receiving a second input, and
   executing the application.

5. The method according to claim 4, wherein the second input corresponds to a push on a button.

6. The method according to claim 1, wherein the application comprises at least one of a message handler application, a contact handler application or a browser application.

7. The method according to claim 1, wherein at least a portion of the superposed application icon is displayed over a portion of the background image that was displayed immediately prior to the display of the first superposed application icon.

8. The method according to claim 1, wherein the superposed application icon is the only icon superposed over any portion of the idle mode background image during the duration of the display of the superposed application icon.

9. The method according to claim 1, wherein the application icon associated with the application comprises an image indicative of the application.

10. The method according to claim 1, further comprising ending the superposition of the application icon over the at least a part of the background image when the at least one or more related grid elements are no longer selected.

11. The method according to claim 1, comprising replacing the application icon with another application icon associated with another application in response to another input related to another of the at least one or more grid elements.

12. The method according to claim 1, wherein the vertical confining lines and the horizontal confining lines are movable.

13. The method according to claim 12, wherein a shape of at least one of the grid elements is selectable or definable.

14. The method according to claim 12, wherein a visible text is associated with one or more of the grid elements.

15. A mobile communications device comprising:
   a display,
   electronic circuitry configured to:
      divide an idle mode background image of a display of a mobile communications device into one or more grid elements of a grid system, the grid system comprising vertical confining lines and horizontal confining lines;
      receive input from a control device of the mobile communications device;
      relate the input to at least one of the one or more grid elements;
      determine an application which is linked to the at least one of the one or more related grid elements such that the application is operable to be executed in response to a selection of the at least one or more related grid elements; and
      upon selection of the at least one or more related grid elements, superpose an application icon associated with the application over at least a part of the idle mode background image;
      wherein the grid system is visible in a setting mode and non-visible otherwise; and wherein the grid system is specific for the idle mode background image so that the aspect ratio of the grid system is independent of the user input.

16. The mobile communications device according to claim 15, wherein the application comprises at least one of a message handler application, a contact handler application or a browser application.

17. The mobile communications device according to claim 15, wherein at least a portion of the superposed application icon is displayed over a portion of the background image that was displayed immediately prior to the display of the superposed application icon.

18. The mobile communications device according to claim 15, wherein the superposed application icon is the only icon superposed over any portion of the idle mode background image during the duration of the display of the superposed application icon.

19. The mobile communications device according to claim 15, wherein the application icon associated with the application comprises an image indicative of the application.

20. The mobile communications device according to claim 15, wherein the electronic circuitry is configured to end the superposition of the application icon over the at least a part of the background image when the at least one or more related grid elements are no longer selected.

21. The mobile communications device according to claim 15, wherein the electronic circuitry is configured to replace the application icon with another application icon associated with another application in response to a another input related to another of the at least one or more grid elements.

22. The mobile communications device according to claim 15,
wherein the vertical confining lines and the horizontal confining lines are movable.

23. A non-transitory computer readable memory, comprising computer program code which when executed on a processor:
divides an idle mode background image of a display of a mobile communications device into one or more grid elements of a grid system, the grid system comprising vertical confining lines and horizontal confining lines;
receives input from a control device of the mobile communications device;
relates the input to at least one of the one or more grid elements;
determines an application which is linked to the at least one of the one or more related grid elements such that the application is operable to be executed in response to a selection of the at least one or more related grid elements; and
upon selection of the at least one or more related grid elements, superposes an application icon associated with the application over at least a part of the idle mode background image;
wherein the grid system is visible in a setting mode and non-visible otherwise; and
wherein the grid system is specific for the idle mode background image so that the aspect ratio of the grid system is independent of the user input.

24. The non-transitory computer readable memory according to claim 23, wherein the application comprises at least one of a message handler application, a contact handler application or a browser application.

* * * * *